United States Patent
Ibrahim et al.

(10) Patent No.: US 11,597,519 B2
(45) Date of Patent: Mar. 7, 2023

(54) ARTIFICIALLY INTELLIGENT FLIGHT CREW SYSTEMS AND METHODS

(71) Applicant: THE BOEING COMPANY, Chicago, IL (US)

(72) Inventors: Yakentim M. Ibrahim, Brier, WA (US); Daniel K. Bittner, Everett, WA (US)

(73) Assignee: THE BOEING COMPANY

(*) Notice: Subject to any disclaimer, the term of this patent is extended or adjusted under 35 U.S.C. 154(b) by 1296 days.

(21) Appl. No.: 16/001,639

(22) Filed: Jun. 6, 2018

(65) Prior Publication Data

US 2019/0112050 A1  Apr. 18, 2019

Related U.S. Application Data

(60) Provisional application No. 62/573,509, filed on Oct. 17, 2017.

(51) Int. Cl.

| | |
|---|---|
| *G06F 9/451* | (2018.01) |
| *B64D 11/00* | (2006.01) |
| *G06F 9/50* | (2006.01) |
| *G06K 9/62* | (2022.01) |
| *B64D 43/00* | (2006.01) |
| *G06N 20/00* | (2019.01) |

(52) U.S. Cl.
CPC .......... *B64D 11/0015* (2013.01); *B64D 43/00* (2013.01); *G06F 9/453* (2018.02); *G06F 9/5038* (2013.01); *G06K 9/62* (2013.01); *G06N 20/00* (2019.01)

(58) Field of Classification Search
CPC ....................................................... G06F 9/45
See application file for complete search history.

(56) References Cited

U.S. PATENT DOCUMENTS

| | | |
|---|---|---|
| 4,618,984 A | 10/1986 | Das et al. |
| 5,829,000 A | 10/1998 | Huang et al. |
| 5,884,258 A | 3/1999 | Rozak et al. |
| 5,899,976 A | 5/1999 | Rozak |
| 5,950,160 A | 9/1999 | Rozak |

(Continued)

OTHER PUBLICATIONS

Extended European Search Report for corresponding EP Application No. 18202877.9-1010 dated Oct. 24, 2019.

*Primary Examiner* — Di Xiao
(74) *Attorney, Agent, or Firm* — The Small Patent Law Group LLC; Joseph M. Butscher

(57) ABSTRACT

A passenger assistant system includes an artificial intelligence processing unit, a sensor interface, a flight crew interface, a passenger interface, and at least one end effector. The sensor interface couples the artificial intelligence processing unit with at least one sensor configured to provide environmental information regarding a cabin of an aircraft. The flight crew interface couples the artificial intelligence processing unit with at least one flight crew input. The passenger interface couples the artificial intelligence processing unit with at least one passenger input. The at least one end effector is coupled to the artificial intelligence processing unit. The artificial intelligence processing unit is configured to direct the at least one end effector to perform at least one task responsive to information acquired from one or more of the sensor interface, flight crew interface, or passenger interface.

20 Claims, 4 Drawing Sheets

(56) References Cited

U.S. PATENT DOCUMENTS

| | | |
|---|---|---|
| 6,490,557 B1 | 12/2002 | Jeppesen |
| 6,766,295 B1 | 7/2004 | Murveit et al. |
| 7,496,510 B2 | 2/2009 | Frank et al. |
| 8,036,893 B2 | 10/2011 | Reich |
| 8,099,288 B2 | 1/2012 | Zhang et al. |
| 8,214,208 B2 | 7/2012 | Mallett et al. |
| 9,205,914 B1 | 12/2015 | Fagan et al. |
| 11,021,253 B2 * | 6/2021 | Muirhead .............. G06Q 10/02 |
| 2003/0154080 A1 | 8/2003 | Godsey et al. |
| 2004/0148161 A1 | 7/2004 | Das et al. |
| 2005/0192801 A1 | 9/2005 | Lewis et al. |
| 2005/0197835 A1 | 9/2005 | Reinhard et al. |
| 2006/0020462 A1 | 1/2006 | Reich |
| 2006/0067508 A1 | 3/2006 | Basson et al. |
| 2008/0133241 A1 | 6/2008 | Baker et al. |
| 2008/0201148 A1 | 8/2008 | Desrochers |
| 2009/0177461 A1 | 7/2009 | Ehsani et al. |
| 2010/0057450 A1 | 3/2010 | Koll |
| 2010/0250243 A1 | 9/2010 | Schalk et al. |
| 2011/0093261 A1 | 4/2011 | Angott |
| 2011/0131042 A1 | 6/2011 | Nagatomo |
| 2011/0202876 A1 * | 8/2011 | Badger ................. G06F 40/247 706/12 |
| 2012/0143605 A1 | 6/2012 | Thorsen et al. |
| 2012/0179465 A1 | 7/2012 | Cox et al. |
| 2012/0273650 A1 | 11/2012 | Schevardo et al. |
| 2013/0030789 A1 | 1/2013 | Dalce |
| 2013/0238336 A1 | 9/2013 | Sung et al. |
| 2014/0058732 A1 | 2/2014 | Labsky et al. |
| 2015/0239561 A1 * | 8/2015 | Hau ....................... G06Q 10/08 715/771 |
| 2016/0352412 A1 | 12/2016 | Di Costanzo et al. |
| 2016/0372117 A1 | 12/2016 | Klose et al. |
| 2017/0013188 A1 * | 1/2017 | Kothari .................... B60R 1/00 |
| 2017/0064067 A1 | 3/2017 | Hockenberry et al. |
| 2018/0165974 A1 * | 6/2018 | Bonkoski ............. G08G 5/0021 |
| 2018/0260718 A1 * | 9/2018 | Biswas ............. G06F 16/24578 |
| 2018/0281990 A1 * | 10/2018 | Fagan ....................... B64F 5/60 |
| 2018/0346284 A1 * | 12/2018 | Swami ................... B66B 5/027 |
| 2019/0188814 A1 * | 6/2019 | Kreitzer ............. G06F 21/6245 |

\* cited by examiner

US 11,597,519 B2

ARTIFICIALLY INTELLIGENT FLIGHT CREW SYSTEMS AND METHODS

RELATED APPLICATIONS

This application relates to and claims priority benefits from U.S. Provisional Patent Application No. 62/573,509, entitled "Artificially Intelligent Flight Crew Systems and Methods," filed Oct. 17, 2017, which is hereby incorporated by reference in its entirety.

FIELD OF EMBODIMENTS OF THE DISCLOSURE

Embodiments of the present disclosure generally relate to artificially intelligent passenger assistant systems, such as within a commercial aircraft.

BACKGROUND OF THE DISCLOSURE

Commercial aircraft typically include an interior cabin in which passengers remain during a flight. During the flight, flight attendants may be employed to assist the passengers with any issues that arise, or in providing a convenient and/or comfortable experience for the passengers. However, flight attendants have a limited amount of time to assist each passenger, particularly as the number of passengers becomes larger. Accordingly, passengers may not receive attention as quickly as desired when flight attendants are busy performing other tasks.

Under conventional systems, flight attendants may travel to an attendant panel and navigate touch screen menus to set various parameters. However, this approach has certain drawbacks, including the serialization of tasks, the time it takes to navigate the menus of the attendant panel, and the difficulties of considering a variety of circumstances to evaluate which tasks are to be performed and/or in what order tasks are to be performed.

SUMMARY OF THE DISCLOSURE

A need exists for improved passenger assistance during flights. Further, a need exists for a passenger assistance system that receives commands and/or requests from one or more sources, and autonomously and efficiently performs tasks responsive to the commands and/or requests.

With those needs in mind, certain embodiments of the present disclosure provide an passenger assistant system that includes an artificial intelligence processing unit, a sensor interface, a flight crew interface, a passenger interface, and at least one end effector. The sensor interface couples the artificial intelligence processing unit with at least one sensor configured to provide environmental information regarding a cabin of an aircraft. The flight crew interface couples the artificial intelligence processing unit with at least one flight crew input. The passenger interface couples the artificial intelligence processing unit with at least one passenger input. The at least one end effector is coupled to the artificial intelligence processing unit. The artificial intelligence processing unit is configured to direct the at least one end effector to perform at least one task responsive to information acquired from one or more of the sensor interface, flight crew interface, or passenger interface.

Certain embodiments of the present disclosure provide a method that includes receiving, via a sensor interface coupling an artificial intelligence processing unit with at least one sensor, environmental information regarding a cabin of an aircraft. The method also includes receiving, via a flight crew interface, at least one flight crew input. Further, the method includes receiving, via a passenger interface, at least one passenger input. Also, the method includes directing, with the artificial intelligence processing unit, at least one end effector to perform at least one task responsive to one or more of the environmental information, flight crew input, or passenger input.

Certain embodiments of the present disclosure provide a tangible and non-transitory computer-readable medium having instructions stored thereon. The instructions, when executed by a computer, causing the computer to: receive, via a sensor interface with at least one sensor, environmental information regarding a cabin of an aircraft; receive, via a flight crew interface, at least one flight crew input; receive, via a passenger interface, at least one passenger input; and direct at least one end effector to perform at least one task responsive to one or more of the environmental information, flight crew input, or passenger input.

DETAILED DESCRIPTION OF THE DISCLOSURE

Figure 1:
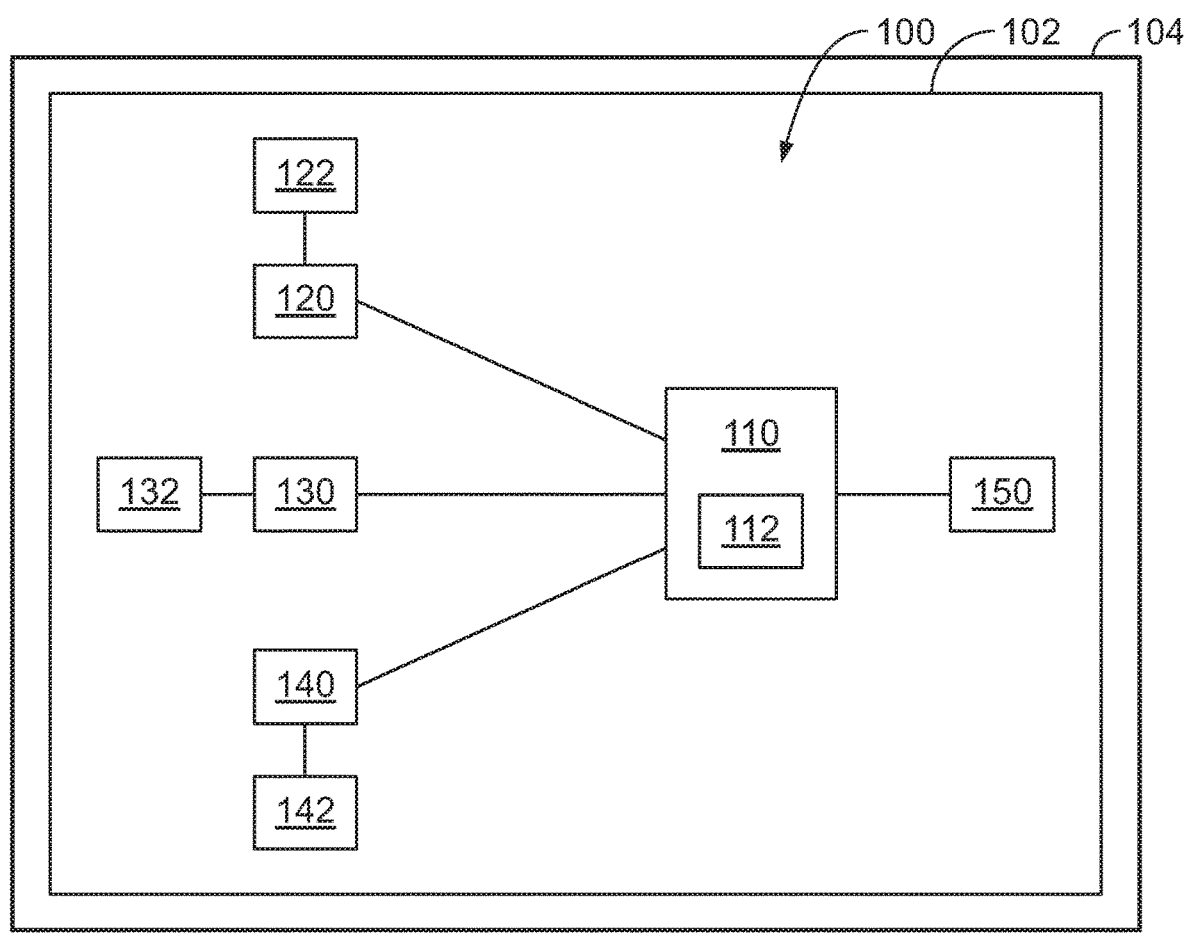
FIG. 1 illustrates a block diagram of a passenger assistance system within an internal cabin of a vehicle, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide autonomous or semi-autonomous passenger assistant systems and methods. A fully autonomous system may be understood as a system that performs one or more tasks without the intervention of a human user. A semi-autonomous system may be understood as a system that performs aspects of one or more tasks without human intervention and aspects of one or more tasks with human intervention. For example, a semi-autonomous system may determine a control action based on received inputs, without using human intervention in the determination of the control action, with the control action then presented to a human for approval and/or implementation. Various embodiments provide for passenger assistant systems that employ artificial intelligence, and such a passenger assistant system may be referred to as an artificial intelligence assistant or an artificial intelligence cabin assistant. For example, various embodiments employ passenger assistant systems that can learn or be trained (e.g., on an ongoing basis) based on historical or previous information correlating inputs (e.g., commands or requests) with desired or preferred outputs (e.g., control actions).

In at least one embodiment, an artificial intelligence assistant may respond to naturally spoken voice commands (and/or other inputs) for the operation of cabin features and/or functions on an airplane. Examples of such features and/or functions include environmental settings, lighting, displays, sounds, audio, meal preparation, gate turn, or the like. Further, while speech recognition may be employed to index captured text into a list of possible outcomes, in various embodiments the artificial intelligence assistant enables interactive dialogue and assumption of roles to alleviate the work load of flight attendants. Learning by the artificial intelligence assistant leverages pattern recognition for predictive management of tasks that would otherwise burden the crew.

In various embodiments, an artificial intelligence cabin assistant anticipates, interprets, and/or infers desired responses (e.g., states and actions) to verbal stimulus and/or other inputs. Further, the artificial intelligence cabin assistant may have access to sensors and/or historical patterns for use in performing tasks that may require decision-making (e.g., prioritizing among requests or commands, identifying commands or requests that may have been made in error, adjusting commands or requests to provide an improved output).

Various embodiments provide an architectural suite of components coupled to an intelligent (e.g., artificially intelligent) entity that receives stimulus (e.g., voice commands, sensor states, and/or flight phase), makes decisions (e.g., based on pattern recognition and statistical recommendations from a number of possible outcomes), and takes action (e.g., by altering states of one or more end effectors for features and/or functions). Various embodiments utilize an architectural suite of components and a computing platform with sufficient processing to host an artificially intelligent application, a human user interface (e.g., a microphone and speakers for voice-activated interaction, a touch screen for tactile interaction), sensors to gather information on conditions, and end effectors controlled by the computing platform.

FIG. 1 illustrates a block diagram of a passenger assistance system 100 within an internal cabin 102 of a vehicle 104, according to an embodiment of the present disclosure. In at least one embodiment, the vehicle 104 is a commercial jet. Optionally, the vehicle 104 may be other types of aircraft, a land-based vehicle (such as an automobile, bus, or the like), a watercraft (such as a boat), or a spacecraft.

As seen in FIG. 1, the depicted passenger assistance system 100 includes an artificial intelligence processing unit 110, a sensor interface 120, a flight crew interface 130, a passenger interface 140, and an end effector 150. It may be noted that while only a single example of each component is depicted in FIG. 1, plural numbers of one or more of the blocks may be employed in various embodiments. Generally, the artificial intelligence processing unit 110 received inputs or information (or stimuli) from one or more of the sensor interface 120, the flight crew interface 130, or the passenger interface 140, and determines one or more tasks to be performed. The artificial intelligence processing unit 110 provides one or more control commands to the end effector 150 to perform the determined one or more tasks.

The artificial intelligence processing unit 110 includes a memory 112. Generally, the artificial intelligence processing unit 110 is capable of machine learning, or being trained based on received information. For example, based on historical information provided to the artificial intelligence processing unit 110 and/or information accumulated over time by the artificial intelligence processing unit 110, the artificial intelligence processing unit 110 may determine, or select from a number of possible outcomes, commands or actions based on pattern recognition and/or statistical recommendations. The depicted artificial intelligence processing unit 110 is coupled to each of the sensor interface 120, the flight crew interface 130, and the passenger interface 140, and receives inputs or information from each of those components. Further, the artificial intelligence processing unit 110 is coupled to the end effector 150 and provides commands to the end effector. In the illustrated embodiment, the artificial intelligence processing unit 110 is configured to direct the end effector 150 to perform at least one task responsive to information acquired from one or more of the sensor interface 120, flight crew interface 130, and passenger interface 140. It may be noted that the artificial intelligence processing unit 110 in various embodiments is configured (e.g., programmed) to receive audible verbal commands, requests, or information, and to use speech and/or speaker recognition to translate and recognize the audible information and/or confirm the identity of the speaker. For example, the artificial intelligence processing unit 110 may be configured to receive a verbal speech string spoken by a user (e.g., flight crew member or passenger), and tokenize the string to parse commands within the string.

In various embodiments the artificial intelligence processing unit 110 includes processing circuitry configured to perform one or more tasks, functions, or steps discussed herein. It may be noted that "processing unit" as used herein is not intended to necessarily be limited to a single processor or computer. For example, the artificial intelligence processing unit 110 may include multiple processors, ASIC's, FPGA's, and/or computers, which may be integrated in a common housing or unit, or which may distributed among various units or housings. It may be noted that operations performed by the artificial intelligence processing unit 110 (e.g., operations corresponding to process flows or methods discussed herein, or aspects thereof) may be sufficiently complex that the operations may not be performed by a human being within a reasonable time period. In the illustrated embodiment, the artificial intelligence processing unit 110 includes a tangible, non-transitory memory 112 for storage of, among other things, instructions for causing the artificial intelligence processing unit 110 to perform one or more steps or tasks discussed herein. The memory 112 may also store historical data, for example, relating to desired or preferred actions to be taken responsive to information or one or more stimuli or information received by artificial intelligence processing unit 110.

The artificial intelligence processing unit 110, using information or stimuli from the sensor interface 120 (e.g., ambient conditions, flight status), flight crew interface 130 (e.g., commands or requests from flight crew), and/or passenger interface 140 (e.g., requests from one or more passengers) is configured to anticipate, interpret, and/or infer desired responses (e.g., states and actions). The artificial intelligence processing unit 110, for example, may determine one or more states to achieve or actions to perform within the cabin 102 responsive to a verbal stimulus received from the flight crew and/or one or more passengers. Beyond simple command and control, the artificial intelligence processing unit 110 in various embodiments assumes responsibility for certain tasks that require decision making. For example, the artificial intelligence processing unit 110 may use information from sensors along with historic patterns to make decisions regarding one or more states and/or actions related to the cabin 102.

Further still, the artificial intelligence processing unit 110 in various embodiments is configured to prioritize a series of tasks, and to direct the end effector 150 to perform the prioritized series of tasks. The tasks, as one example, may be prioritized based on an urgency level or other predetermined hierarchy. As another example, the tasks may be prioritized based on requestor status (e.g., a command or request from a flight crew member may be performed preferentially with respect to a request from a passenger).

Further still, in various embodiments the artificial intelligence processing unit is configured to receive an initial command from at least one of the flight crew interface 130 or the passenger interface 140, modify the command based on historical information and/or information from the sensor interface 120, and direct the end effector 150 to perform the modified command. For example, a received command, based on a context defined from additional information from the sensor interface 120 and/or based on a flight status, may be inconsistent with historically preferred or desired states or actions corresponding to the context. Accordingly, the command may be modified based on the context before implementation. For example, the artificial intelligence processing unit 110 may modify the command using sensor information from the sensor interface 120. For instance, a request from an individual passenger to increase the temperature of the cabin 102 may be ignored if the cabin 102 already has a temperature at an upper threshold, or may be limited to implementation in a portion of the cabin 102 (e.g., an area immediately surrounding the requestor) if the requested increase would be uncomfortable for other passengers based on historical information.

The sensor interface 120 couples the artificial intelligence processing unit 110 with at least one sensor (e.g., sensor 122 in the illustrated embodiment) that is configured to provide environmental information regarding the cabin 102 of the aircraft 104. Generally, the sensor 122 is configured to detect, measure, or collect information corresponding to a condition of the cabin 102 (and/or aircraft in which the cabin is disposed). For example, the sensor 122 may be configured to sense one or more of light, temperature, or other ambient condition. For example, the sensor 122 may include a light meter, a thermometer, or a pressure sensor. As another example, the sensor 122 may collect visual information. For instance, in some embodiments, the sensor 122 includes a camera. For example, a camera may be used to detect a person of interest, with an alert sent to the flight crew autonomously regarding the presence and/or location of the person of interest. The sensor 122 in various embodiments may also provide airplane data, such as estimated time of arrival, flight status (such as whether plane is at cruising altitude, ascending, descending, engaged in takeoff or landing, within a threshold time of takeoff or landing, or on runway). The artificial intelligence processing unit 110 may use information from the sensor interface 120 to initiate an action (e.g., if light or temperature exceed a threshold or deviate from a preferred or desired range) and/or modify a request (e.g., if a light level is at or near a maximum and a request for increasing light level is received, the request may be denied or modified by increasing the light level an amount less than that requested). While a single sensor interface 120 and sensor 122 are shown for ease of illustration in FIG. 1, it may be noted that multiple sensor interfaces 120 and/or sensors 122 may be employed in various embodiments. Further, in various embodiments, one or more sensor interfaces 120 may form a single physical entity with one or more sensors 122.

The flight crew interface 130 couples (or provides) the artificial intelligence processing unit 110 with at least one flight crew input (represented as block 132 in the illustrated embodiment). The flight crew interface 130 is generally configured to at least one of receive information, commands, and/or requests from the flight crew (e.g., pilot, flight attendant), or provide information, direction, and/or instructions to the flight crew. The flight crew interface 130, for example, may include a keyboard or other device configured to receive manually entered information from a flight crew member. As another example, the flight crew interface 130 may include a connection to a centralized computer onboard the aircraft 104 that automatically or autonomously provides information regarding the aircraft 104. As one more example, the flight crew interface 130 may include a touchscreen configured to receive tactile input from a crew member and to provide a display to the crew member. As yet another example, the flight crew interface 130 may include a microphone to receive audible information from a flight crew member and/or a speaker to provide audible information to a flight crew member. While one flight crew interface 130 is depicted in FIG. 1, it may be noted that multiple flight crew interfaces 130 may be employed in various embodiments. It may further be noted that flight crew interfaces 130 may be fixed or stationary within the cabin 102 (e.g., located near flight controls for use by a pilot, located in a centralized location for use by one or more flight attendants), or mobile (e.g., carried by a flight attendant).

The passenger interface 140 couples (or provides) the artificial intelligence processing unit 110 with at least one passenger input (represented as block 142 in the illustrated embodiment). The passenger interface 140 is generally configured to at least one of receive information, commands, and/or requests from a passenger (or passengers), or provide information, direction, and/or instructions to a passenger or passengers. The passenger interface 140, for example, may include a keyboard or other device configured to receive manually entered information from one or more passengers. As another example, the passenger interface 140 may include a touchscreen configured to receive tactile input from one or more passengers and to provide a display to one or more passengers. As yet another example, the passenger interface 140 may include a microphone to receive audible information from one or more passengers and/or a speaker to provide audible information to one or more passengers. While one passenger interface 140 is depicted in FIG. 1, it may be noted that multiple passenger interfaces 140 may be employed in various embodiments. It may further be noted that passenger interfaces 140 may be shared by one or more passengers within the cabin 102 (e.g., located in a centralized location for use by one or more passengers, such as a screen positioned to be viewed by multiple passengers, or a speaker positioned to provide audible information to multiple passengers), or dedicated for use by an individual passenger (e.g., located at an individual seat, or a mobile unit carried by an individual passenger).

The end effector 150 is coupled to the artificial intelligence processing unit 110, and is directed by (e.g., receives control signals from) the artificial intelligence processing unit 110 to perform at least one task (e.g., a task determined by the artificial intelligence processing unit 110 based on information and/or stimuli acquired via the sensor interface 120, flight crew interface 130, and/or passenger interface 140. Generally, the end effector 150 is configured to perform a feature or function (e.g., to provide improved comfort or convenience to one or more passengers and/or to respond to a request from one or more passengers). For example, the end effector 150 may be used to control an ambient condition (e.g., temperature) of the cabin 102, to provide audio to the cabin 102 (e.g., music, auditory information, auditory commands), prepare stow bins, prepare a galley, prepare a lavatory, or visually display information. Accordingly, the end effector 150 in various embodiments may be configured as, include, or be associated with one or more of a speaker, a display screen, a control system that adjusts temperature or other ambient condition, a control system associated with a galley, a control system associated with a lavatory, or lights or lighting controls. While one end effector 150 is depicted in FIG. 1, it may be noted that multiple end effectors 150 may be employed in various embodiments.

It may be noted that the task to be performed may be a predictive task. For example, the artificial intelligence processing unit 110 may determine a predictive task to be performed based on information acquired from one or more of the sensor interface 120, flight crew interface 130, or passenger interface 140, and/or historical information (e.g., historical patterns stored in the memory 112 or otherwise accessible by the artificial intelligence processing unit 110).

It may further be noted that the end effector 150 may perform an action or adjust a state that affects all or a large portion of the cabin 102, and/or perform an action or adjust a state that affects a relatively small portion of the cabin 102. For example, the lighting and/or temperature of the entire cabin 102 may be adjusted by the end effector 150. As another example, the lighting and/or temperature of a portion of the cabin 102 (e.g., an area surrounding an individual seat or section of seats) may be adjusted by the end effector 150. Accordingly, in some embodiments, the artificial intelligence processing unit 110 is configured to direct at least one end effector 150 to perform a localized task tailored for a portion of the cabin 102. Alternatively or additionally, in some embodiments, the artificial intelligence processing unit 110 is configured to direct at least one end effector 150 to perform a universal task that affects an entirety of the cabin 102.

Figure 2:
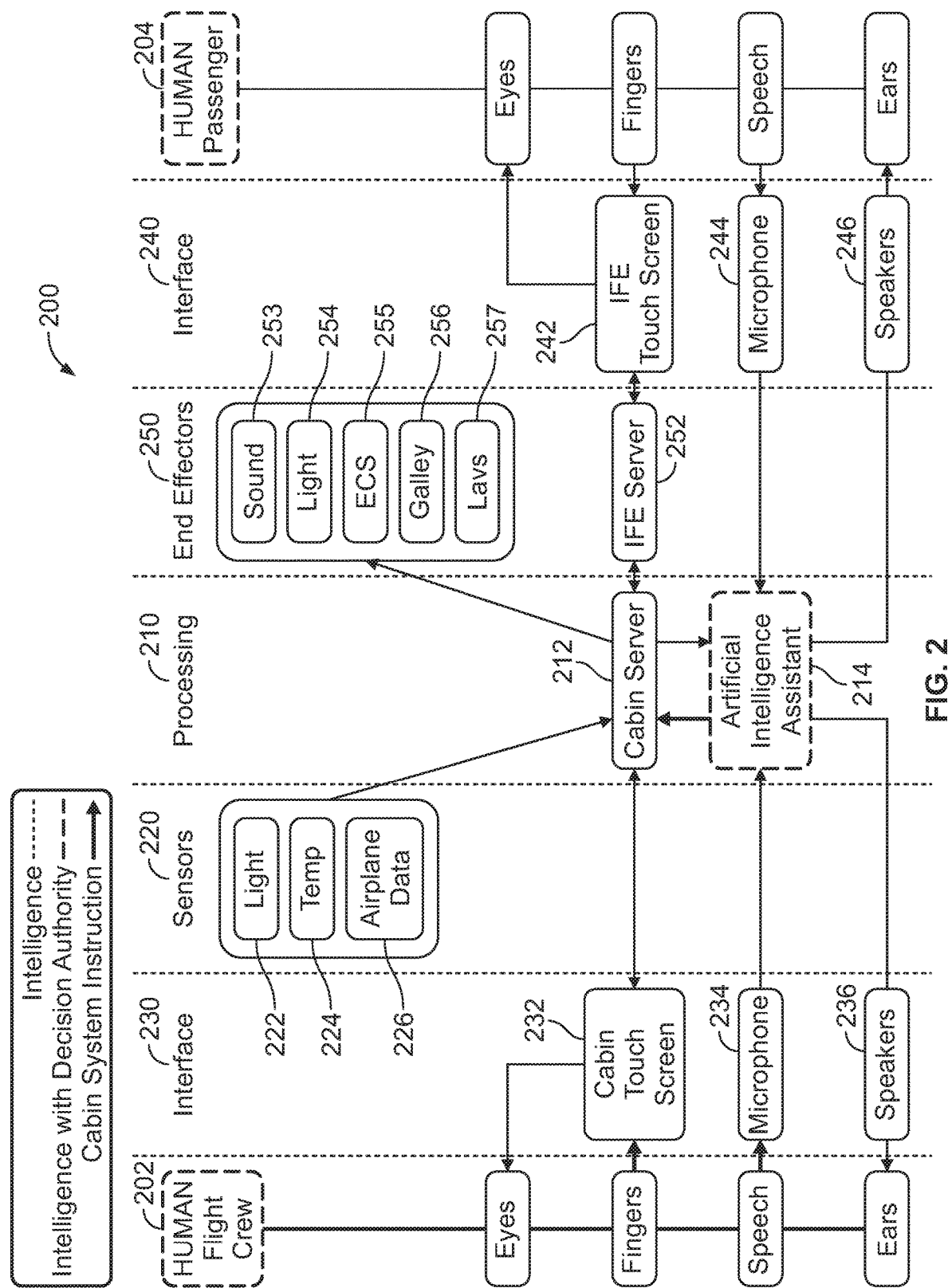
FIG. 2 illustrates a schematic block view of a passenger assistance system, according to an embodiment of the present disclosure.

FIG. 2 provides a schematic view depicting the roles and interactions of components of a system 200. The system 200, for example, may be generally similar in various respects to the passenger assistance system 100, such that one or more aspects of the system 200 may be used in connection with or provide examples of aspects of the system 100, and vice versa. The system 200 is configured for use with a human flight crew 202 and one or more human passengers 204 to control one or more states or actions of a cabin within which the human flight crew 202 and/or the human passenger 204 are located (e.g., cabin 102). For example, the system 200 includes a processing portion 210 including an artificial intelligence assistant 214 (which may incorporate one or more aspects of the artificial intelligence processing unit 110 discussed herein). As indicated by the dashed bold lines of FIG. 2 (which indicate which components have intelligence with decision authority), the flight crew and artificial intelligence assistant 214 have decision authority, but the human passenger 204 does not have decision authority in the illustrated embodiment.

In the depicted embodiment, the artificial intelligence assistant 214 has access to inputs or information available to the human flight crew 202, and has the ability and/or authority to make decisions in response to received information (e.g., information received via screen menus), and to make decisions on behalf of the human flight crew 202 (e.g., via dialogue with passengers). It may be noted that certain decisions may be limited to the human flight crew 202 and/or be subject to approval or modification by the human flight crew 202. In the illustrated example, the artificial intelligence assistant 214 interacts with sensors 220 and end effectors 250 via cabin server 212.

For example, the artificial intelligence assistant 214 may make intelligent decisions for cabin operation including adjusting music, temperature, and/or lighting based on sensor data and/or flight phase. As another example, the artificial intelligence assistant 214 may make intelligent decisions for cabin operation including preparing stow bins, galleys, and/or lavatories based on sensor data and/or flight phase. As one more example, the artificial intelligence assistant 214 may provide smart display updates to relevant passenger areas regarding connecting flight information, or other information of interest to passengers.

The artificial intelligence assistant 214 in various embodiments directs or participates in intelligent passenger dialogue. For example, the artificial intelligence assistant 214 may have voice and/or touchscreen interaction with the human flight crew 202 regarding, for example, system status, command, and/or control. Further, the artificial intelligence assistant 214 may have voice and/or touchscreen interaction with the human passenger 204 regarding, for example, meal orders, blanket requests, assistance, entertainment, and/or status on connecting flights.

As seen in FIG. 2, the human flight crew 202 communicates or interacts with the processing portion 210 via the interface 230. For example, the depicted interface 230 includes a touch screen 232 allowing for visual interaction and interaction via manual inputs with the human flight crew 202. Also, the interface 230 includes a microphone 234 for receiving audible information from the human flight crew 202. Further, the interface 230 includes speakers 236 for providing audible information to the human flight crew 202.

The artificial intelligence assistant 214 also receives input from sensors 220. The sensors 220 generally provide detected, measured, or otherwise acquired information regarding a condition or state of the cabin, aircraft, and/or flight. The sensors 220 in the depicted example include light sensor 222 (providing information regarding lighting of the cabin), temperature sensor 224 (providing information regarding temperature of the cabin), and airplane data interface 226 (providing information regarding operation of the aircraft, condition of the aircraft, flight status, or the like). Additional examples of sensors that may be used in various embodiments include microphones (providing information regarding sounds or background noise levels within the cabin) and cameras (providing imaging information from within the cabin). As seen in FIG. 2, the artificial intelligence assistant 124 in the illustrated example receives input from the sensor 220 via a cabin server 212 of the processing portion 210.

As seen in FIG. 2, the human passenger 204 communicates or interacts with the processing portion 210 via the interface 240. For example, the depicted interface 240 includes a touch screen 242 (e.g., an in-flight entertainment (IFE) touch screen in the illustrated example) allowing for visual interaction and interaction via manual inputs with the human passenger 204. Also, the interface 240 includes a microphone 244 for receiving audible information from the human passenger 204. Further, the interface 240 includes speakers 246 for providing audible information to the human passenger 204.

As also seen in FIG. 2, end effectors 250 are associated with the processing portion 210. For example, the end effectors 250 may receive commands from the artificial intelligence assistant 214 via the cabin server 212. In the illustrated example, the end effectors 250 include a sound effector 253 (which may include and/or control a speaker), a light effector 254 (which may include and/or control lights disposed within a cabin), an environmental control system (ECS) effector 255 (which may control temperature or other ambient conditions of a cabin), a galley end effector 256 (which may control operation of one or more aspects of a galley), and a lays end effector 257 (which may control operation of one or more aspects of a lavatory).

Figure 3:
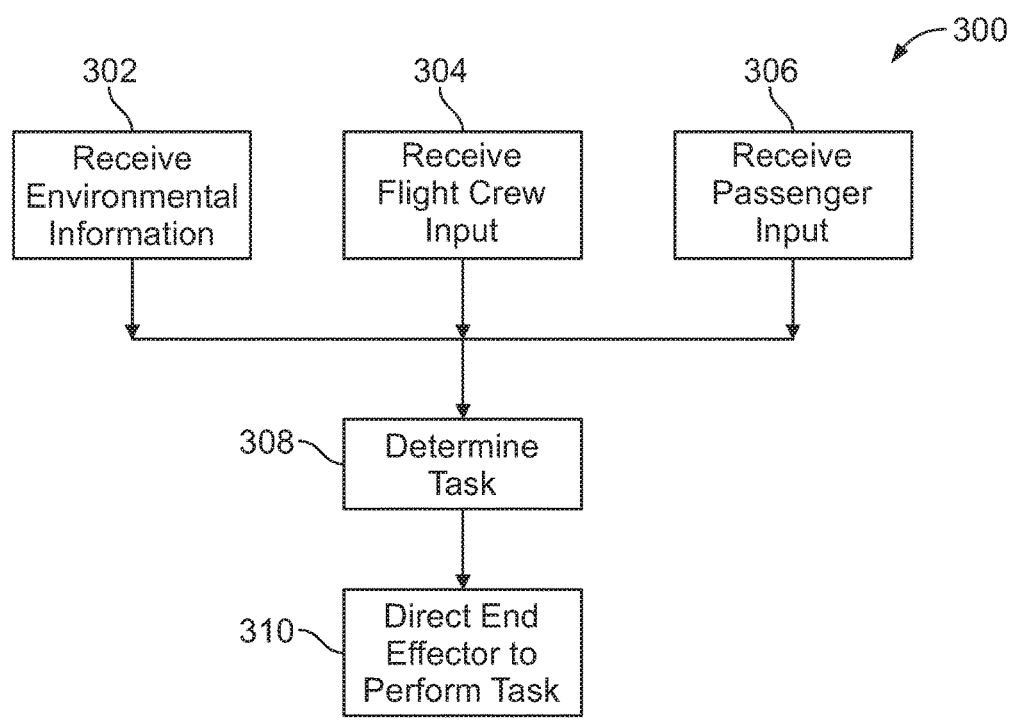
FIG. 3 illustrates a flow chart of a method of operating a passenger assistance system, according to an embodiment of the present disclosure.

FIG. 3 illustrates a flowchart of a method 300. The operations of FIG. 3 may be implemented by one or more processors (e.g., artificial intelligence processing unit 110) executing program instructions stored in memory (e.g., memory 112). The method 300, for example, may employ structures or aspects of various embodiments (e.g., systems and/or methods) discussed herein, such as the system 100. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 300 may be used as one or more algorithms to direct hardware to perform one or more operations described herein. It should be noted, other methods may be used, in accordance with embodiments herein.

At 302, environmental information regarding a cabin of a vehicle (e.g., an aircraft) is received. For example, the environmental information may be received by an artificial intelligence processing unit (e.g., artificial intelligence processing unit 110) via a sensor interface (e.g., sensor interface 120) coupling the artificial intelligence processing unit with a sensor (e.g., sensor 122). The environmental information may include, for example, one or more of information regarding a temperature of the cabin, lighting conditions within the cabin, or vehicle information (e.g., flight status).

At 304, at least one flight crew input is received. For example, the flight crew input may be received by an artificial intelligence processing unit (e.g., artificial intelligence processing unit 110) via a flight crew interface (e.g., flight crew interface 130) providing the artificial intelligence processing unit with an input (e.g., flight crew input 132). The flight crew input may be provided, for example, via a microphone (voice commands or requests), or touchscreen (manually input commands or requests).

At 306, at least one passenger input is received. For example, the passenger input may be received by an artificial intelligence processing unit (e.g., artificial intelligence processing unit 110) via a passenger interface (e.g., passenger interface 140) providing the artificial intelligence processing unit with an input (e.g., passenger input 132). The passenger input may be provided, by way of example, via a microphone (voice requests), or touchscreen (manually input requests).

At 308, a task is determined (e.g., by the artificial intelligence processing unit). The task is determined responsive to one or more of the environmental information, flight crew input, or passenger input. Historical information may also be utilized in determining the task. Generally, the task is configured to alter a state or condition of the cabin, and/or to provide a service or convenience to a passenger. By way of example, the task may include or relate to one or more of controlling an ambient condition (e.g., temperature) of the cabin, providing audio to the cabin (e.g., music, auditory information, auditory commands), preparing stow bins, preparing a galley, preparing a lavatory, or visually displaying information. The task may be determined based on historical patterns of desired outcomes for similar environmental information and/or inputs, for example considering the overall context in which the corresponding environmental information and/or inputs are received. In some embodiments, a prioritized series of tasks may be determined (e.g., based on urgency or other hierarchy). In some embodiments, determination of the task may include modification of a request or command. For example, in some embodiments, an initial command or request (e.g., from flight crew and/or one or more passengers). The command is next modified using historical information (e.g., the command or request is modified to more closely resemble a historically identified improved or optimal command or request from a similar corresponding context to that of the received command or request).

At 310, at least one end effector (e.g., end effector 150) is directed (e.g., by the artificial processing unit) to perform the at least one task (e.g., an individual task, a group of tasks, a prioritized series of tasks, and/or a modified command) determined at 308. For example, a prioritized order of tasks may be determined, and the tasks performed in the determined order. The task may be a predictive task that is determined based on historical information. For example, based on environmental conditions and historical information regarding desired environmental conditions, one or more tasks may be determined to adjust the environmental conditions. The task may be a localized task tailored for a specific portion of the cabin, or may be a universal task that affects an entirety of the cabin.

Figure 4:
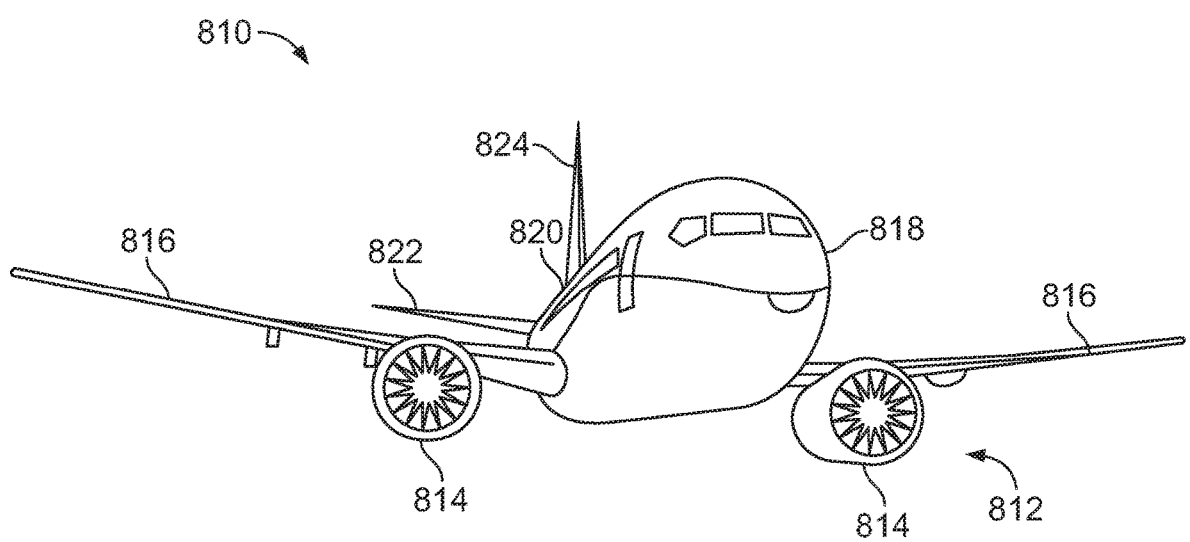
FIG. 4 illustrates a perspective front view of an aircraft, according to an embodiment of the present disclosure.

FIG. 4 illustrates a perspective front view of an aircraft 810, according to an embodiment of the present disclosure. The aircraft 810 is an example of the vehicle 104 shown in FIG. 1. The aircraft 810 includes a propulsion system 812 that may include two turbofan engines 814, for example. Optionally, the propulsion system 812 may include more engines 814 than shown. The engines 814 are carried by wings 816 of the aircraft 810. In other embodiments, the engines 814 may be carried by a fuselage 818 and/or an empennage 820. The empennage 820 may also support horizontal stabilizers 822 and a vertical stabilizer 824.

The fuselage 818 of the aircraft 810 defines an internal cabin (such as the internal cabin 102 shown in FIG. 1), which includes a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class/section divider assemblies, as described herein. The aircraft 810 may include one or more passenger assistance systems 100, such as shown and described with respect to FIGS. 1-3.

Alternatively, instead of an aircraft, embodiments of the present disclosure may be used with various other vehicles, such as automobiles, buses, locomotives and train cars, seacraft, spacecraft, and the like.

Figure 5A:
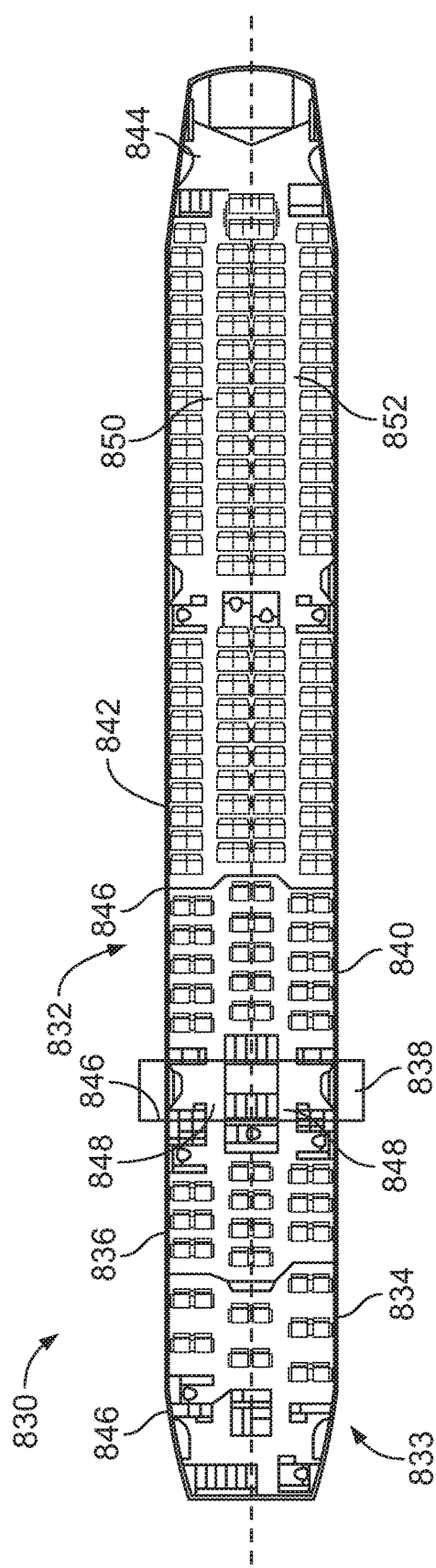
FIG. 5A illustrates a top plan view of an internal cabin of an aircraft, according to an embodiment of the present disclosure.

FIG. 5A illustrates a top plan view of an internal cabin 830 of an aircraft, according to an embodiment of the present disclosure. The internal cabin 830 may be within a fuselage 832 of the aircraft 810, shown in FIG. 4. For example, one or more fuselage walls may define the internal cabin 830. The internal cabin 830 includes multiple sections, including a front section 833, a first class section 834, a business class section 836, a front galley station 838, an expanded economy or coach section 840, a standard economy or coach section 842, and an aft section 844, which may include multiple lavatories and galley stations. It is to be understood that the internal cabin 830 may include more or less sections than shown. For example, the internal cabin 830 may not include a first class section, and may include more or less galley stations than shown. Each of the sections may be separated by a cabin transition area 846, which may include class/section divider assemblies between aisles 848.

As shown in FIG. 5A, the internal cabin 830 includes two aisles 850 and 852 that lead to the aft section 844. Optionally, the internal cabin 830 may have less or more aisles than shown. For example, the internal cabin 830 may include a single aisle that extends through the center of the internal cabin 830 that leads to the aft section 844. The internal cabin 830 may include one or more passenger assistance systems 100, such as shown and described with respect to FIGS. 1-3.

Figure 5B:
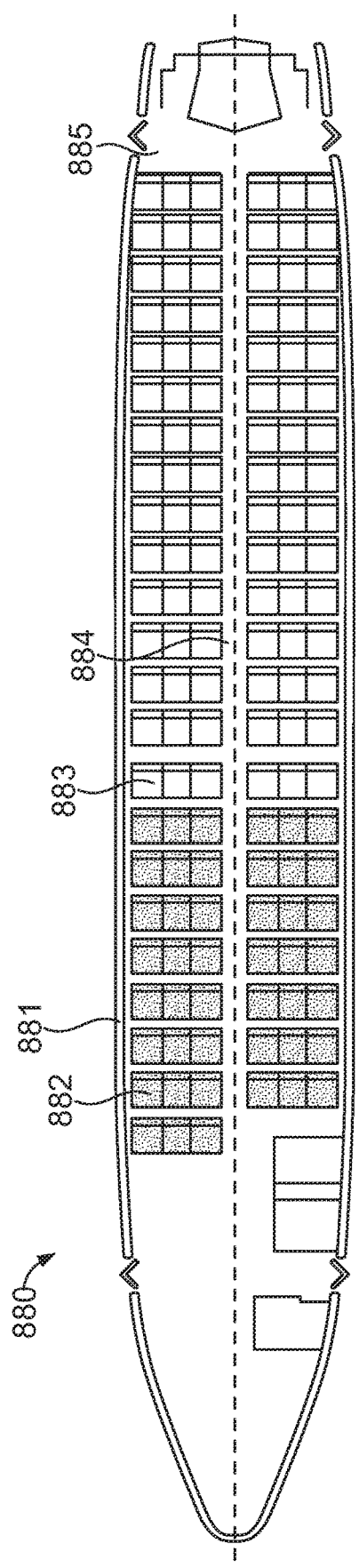
FIG. 5B illustrates a top plan view of an internal cabin of an aircraft, according to an embodiment of the present disclosure.

FIG. 5B illustrates a top plan view of an internal cabin 880 of an aircraft, according to an embodiment of the present disclosure. The internal cabin 880 may be within a fuselage 881 of the aircraft 810, shown in FIG. 4. For example, one or more fuselage walls may define the internal cabin 880. The internal cabin 880 includes multiple sections, including a main cabin 882 having passenger seats 883, and an aft section 885 behind the main cabin 882. It is to be understood that the internal cabin 880 may include more or less sections than shown.

The internal cabin 880 may include a single aisle 884 that leads to the aft section 885. The single aisle 884 may extend through the center of the internal cabin 880 that leads to the aft section 885. For example, the single aisle 884 may be coaxially aligned with a central longitudinal plane of the internal cabin 880. The internal cabin 880 may include one or more passenger assistance systems 100, such as shown and described with respect to FIGS. 1-3.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the artificial intelligence processing unit 110 may be or include one or more processors that are configured to control operation of the passenger assistance system 100, as described above.

The artificial intelligence processing unit 110 is configured to execute a set of instructions that are stored in one or more data storage units or elements (such as one or more memories such as memory 112), in order to process data. The data storage units may also store data or other information as desired or needed. The data storage units may be in the form of an information source or a physical memory element within a processing machine.

The set of instructions may include various commands that instruct the artificial intelligence processing unit 110 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the artificial intelligence processing unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A passenger assistant system comprising:
   an artificial intelligence processing unit configured for one or both of machine learning or being trained based on received information;
   a sensor interface coupling the artificial intelligence processing unit with at least one sensor configured to provide environmental information regarding a cabin of an aircraft;
   a flight crew interface coupling the artificial intelligence processing unit with at least one flight crew input;
   a passenger interface coupling the artificial intelligence processing unit with at least one passenger input; and at least one end effector coupled to the artificial intelligence processing unit;
   wherein the artificial intelligence processing unit is configured to direct the at least one end effector to perform at least one task responsive to information acquired from one or more of the sensor interface, flight crew interface, or passenger interface, wherein the at least one task comprises a localized task tailored for a portion of the cabin.

2. The passenger assistant system of claim 1, wherein the at least one task is a predictive task determined by the artificial intelligence processing unit based on the information acquired and historical information.

3. The passenger assistant system of claim 1, wherein the artificial intelligence processing unit is configured to prioritize a series of tasks, and to direct the at least one end effector to perform the prioritized series of tasks.

4. The passenger assistant system of claim 1, wherein the artificial intelligence processing unit is configured to direct the at least one end effector to perform a universal task that affects an entirety of the cabin.

5. The passenger assistant system of claim 1, wherein the artificial intelligence processing unit is configured to receive an initial command from at least one of the flight crew interface or the passenger interface, modify the command based on historical information, and direct the at least one end effector to perform the modified command.

6. The passenger assistant system of claim 5, wherein the artificial intelligence processing unit is configured to modify the command using sensor information received from the sensor interface.

7. The passenger assistant of claim 1, wherein the artificial intelligence processing unit is configured to direct the at least one end effector to perform tasks responsive to the sensor interface, the flight crew interface, and the passenger interface.

8. A method comprising:
   receiving, via a sensor interface coupling an artificial intelligence processing unit with at least one sensor, environmental information regarding a cabin of an aircraft;
   the artificial intelligence processing unit configured for one or both of machine learning or being trained based on received information;
   receiving, via a flight crew interface, at least one flight crew input;
   receiving, via a passenger interface, at least one passenger input; and
   directing, with the artificial intelligence processing unit, at least one end effector to perform at least one task responsive to one or more of the environmental information, flight crew input, or passenger input, wherein the at least one task comprises a localized task tailored for a portion of the cabin.

9. The method of claim 8, wherein the at least one task is a predictive task determined by the artificial intelligence processing unit based on historical information and the one or more of the environmental information, flight crew input, or passenger input.

10. The method of claim 8, wherein the artificial intelligence processing unit is configured to prioritize a series of tasks, the method comprising directing the at least one end effector to perform the prioritized series of tasks.

11. The method of claim 8, wherein the at least one task comprises a universal task that affects an entirety of the cabin.

12. The method of claim 8, comprising receiving an initial command via at least one of the flight crew interface or the passenger interface, modifying the command based on historical information, and directing the at least one end effector to perform the modified command.

13. The method of claim 12, further comprising modifying the command using the environmental information received from the sensor interface.

14. A tangible and non-transitory computer-readable medium having instructions stored thereon, the instructions, when executed by a computer having an artificial intelligence processing unit, the artificial intelligence processing unit configured for one or both of machine learning or being trained based on received information;
   causing the computer to:
   receive, via a sensor interface with at least one sensor, environmental information regarding a cabin of an aircraft;
   receive, via a flight crew interface, at least one flight crew input;
   receive, via a passenger interface, at least one passenger input; and
   direct at least one end effector to perform at least one task responsive to one or more of the environmental information, flight crew input, or passenger input, wherein the at least one task comprises a localized task tailored for a portion of the cabin.

15. The tangible and non-transitory computer-readable medium of claim 14, wherein the at least one task is a predictive task determined based on historical information and the one or more of the environmental information, flight crew input, or passenger input.

16. The tangible and non-transitory computer-readable medium of claim 14, wherein the instructions cause the computer to prioritize a series of tasks, and direct the at least one end effector to perform the prioritized series of tasks.

17. The tangible and non-transitory computer-readable medium of claim 14, wherein the at least one task comprises a universal task that affects an entirety of the cabin.

18. The tangible and non-transitory computer-readable medium of claim 14, wherein the instructions cause the computer to receive an initial command via at least one of the flight crew interface or the passenger interface, modify the command based on historical information, and direct the at least one end effector to perform the modified command.

19. A passenger assistant system comprising:
    an artificial intelligence processing unit configured for one or both of machine learning or being trained based on received information;
        a sensor interface coupling the artificial intelligence processing unit with at least one sensor configured to provide environmental information regarding a cabin of an aircraft;
        a flight crew interface coupling the artificial intelligence processing unit with at least one flight crew input;
        a passenger interface coupling the artificial intelligence processing unit with at least one passenger input; and
        at least one end effector coupled to the artificial intelligence processing unit;
    wherein the artificial intelligence processing unit is configured to direct the at least one end effector to perform at least one task responsive to information acquired from one or more of the sensor interface, flight crew interface, or passenger interface, wherein the artificial intelligence processing unit is configured to receive an initial command from at least one of the flight crew interface or the passenger interface, modify the initial command based on historical information, and direct the at least one end effector to perform the modified command, and
    wherein the artificial intelligence processing unit is configured to modify the command using sensor information received from the sensor interface.

20. A method comprising:
    receiving, via a sensor interface coupling an artificial intelligence processing unit with at least one sensor, environmental information regarding a cabin of an aircraft;
    the artificial intelligence processing unit configured for one or both of machine learning or being trained based on received information;
    receiving, via a flight crew interface, at least one flight crew input;
    receiving, via a passenger interface, at least one passenger input;
directing, with the artificial intelligence processing unit, at least one end effector to perform at least one task responsive to one or more of the environmental information, flight crew input, or passenger input;
    receiving an initial command via at least one of the flight crew interface or the passenger interface;
    modifying the initial command based on historical information and using the environmental information received from the sensor interface; and
directing the at least one end effector to perform the modified command.

* * * * *